(12) United States Patent
Wang et al.

(10) Patent No.: US 10,572,743 B1
(45) Date of Patent: Feb. 25, 2020

(54) REAL-TIME COLOR CLASSIFICATION FOR STREET VEHICLES

(71) Applicant: Ambarella, Inc., Santa Clara, CA (US)

(72) Inventors: Yu Wang, San Jose, CA (US); Leslie D. Kohn, Saratoga, CA (US)

(73) Assignee: Ambarella, Inc., Santa Clara, CA (US)

( * ) Notice: Subject to any disclaimer, the term of this patent is extended or adjusted under 35 U.S.C. 154(b) by 38 days.

(21) Appl. No.: 15/687,760

(22) Filed: Aug. 28, 2017

(51) Int. Cl.
| | |
|---|---|
| *G06K 9/00* | (2006.01) |
| *G06K 9/46* | (2006.01) |
| *G06K 9/62* | (2006.01) |
| *G06T 7/11* | (2017.01) |
| *G06T 7/90* | (2017.01) |

(52) U.S. Cl.
CPC ....... *G06K 9/00798* (2013.01); *G06K 9/4652* (2013.01); *G06K 9/6202* (2013.01); *G06K 9/6215* (2013.01); *G06T 7/90* (2017.01); *G06T 7/11* (2017.01); *G06T 2207/10024* (2013.01); *G06T 2207/20024* (2013.01); *G06T 2207/30256* (2013.01)

(58) Field of Classification Search
CPC ............. G06K 9/00798; G06K 9/6267; G06K 9/4652; G06K 9/6202; G06K 9/6215; G06K 2207/10024; G06K 2207/20024; G06K 2207/30256; G06T 2207/10024; G06T 3/4015; G06T 2207/30256; G06T 7/11; G06T 7/90
See application file for complete search history.

(56) References Cited

U.S. PATENT DOCUMENTS

| | | | | |
|---|---|---|---|---|
| 2002/0041332 A1* | 4/2002 | Murata | ................... | H04N 9/045 348/272 |
| 2005/0169501 A1* | 8/2005 | Fujii | .................. | G06K 9/00798 382/104 |
| 2012/0194677 A1* | 8/2012 | Suzuki | ............... | G06K 9/00798 348/148 |
| 2014/0149376 A1* | 5/2014 | Kutaragi | .............. | G06K 9/4676 707/706 |
| 2014/0347530 A1* | 11/2014 | Kanou | ................... | H04N 9/045 348/254 |
| 2015/0347886 A1* | 12/2015 | Fang | .................. | G06K 19/0614 235/462.04 |

* cited by examiner

*Primary Examiner* — Kenny A Cese
(74) *Attorney, Agent, or Firm* — Christopher P. Maiorana, PC (57) ABSTRACT

An apparatus includes a memory and a circuit. The memory may be configured to store an input image having a plurality of color channels. The circuit may be configured to (i) calculate a plurality of average values of each of the color channels in a plurality of windows around each of a plurality of pixel locations in the input image, (ii) calculate a plurality of feature values based on the average values using a feature extraction process and (iii) generate a plurality of likelihood values of a specific color at each of the pixel locations using the feature values in a color classification process.

20 Claims, 7 Drawing Sheets

REAL-TIME COLOR CLASSIFICATION FOR STREET VEHICLES

FIELD OF THE INVENTION

The invention relates to computer vision generally and, more particularly, to a method and/or apparatus for implementing real-time color classification for street vehicles.

BACKGROUND

Detecting and recognizing a color of yellow lane markers on a road is important to autonomous driving. The yellow lane markers are conventionally used to separate traffic flow in opposite directions and to separate the road from pavement edges. The color recognition problem is challenging when the lane markers are faded, degraded and when lighting conditions are poor. Furthermore, conventional color recognition techniques are computationally demanding and thus difficult to perform in real time.

It would be desirable to implement a real-time color classification for street vehicles.

SUMMARY

The invention concerns an apparatus including a memory and a circuit. The memory may be configured to store an input image having a plurality of color channels. The circuit may be configured to (i) calculate a plurality of average values of each of the color channels in a plurality of windows around each of a plurality of pixel locations in the input image, (ii) calculate a plurality of feature values based on the average values using a feature extraction process and (iii) generate a plurality of likelihood values of a specific color at each of the pixel locations using the feature values in a color classification process.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing real-time color classification for street vehicles that may (i) detect a color of markings in a road, (ii) operate with any specified color of marker, (iii) generate likelihood values that a pixel of interest is the specified color, (iv) provide robust road mark detection, (v) provide lane mark detection and/or (vi) be implemented as one or more integrated circuits.

Embodiments of the invention generally provide a robust color classification technique that runs in real-time. The color classification technique generally comprises a feature extraction step and a classification step. In the feature extraction step, multiple features may be computed for each pixel of an input image. Results of the color classification technique may be subsequently combined with a road mark location technique in a manual and/or an autonomous driving system.

Figure 1:
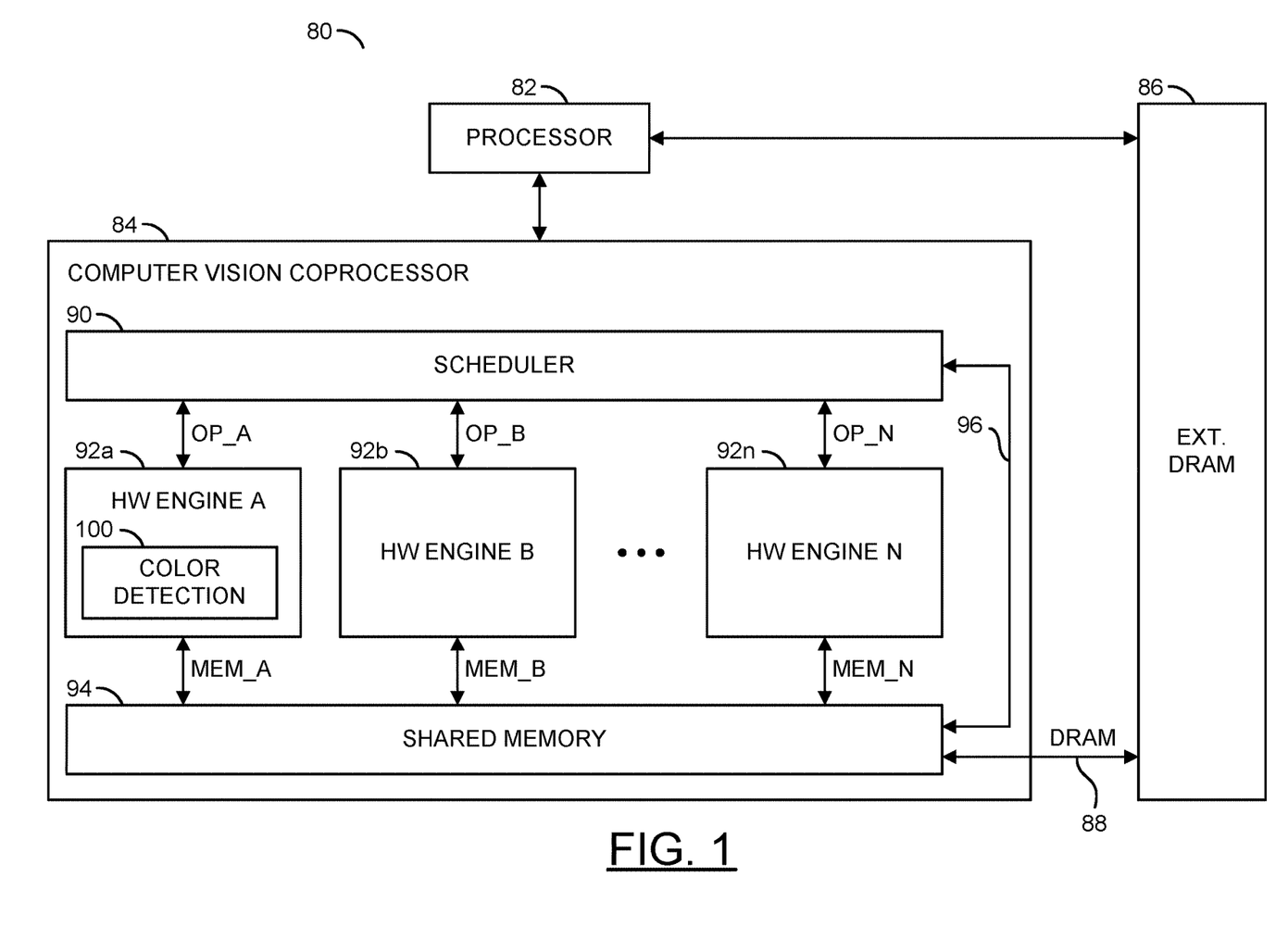
FIG. 1 is a diagram illustrating a context of a color classification process.

Referring to FIG. 1, a diagram is shown illustrating a context in which a color classification process in accordance with an embodiment of the invention may be implemented. The system (or apparatus) 80 may be implemented as part of a computer vision system. In various embodiments, the system 80 may be implemented as part of a camera, a computer, a server (e.g., a cloud server), a smart phone (e.g., a cellular telephone), a personal digital assistant, or the like.

In an example embodiment, the system 80 generally comprises a block (or circuit) 82, a block (or circuit) 84, a block (or circuit) 86 and a memory bus 88. The circuit 84 generally comprises a block (or circuit) 90, one or more blocks (or circuits) 92a-92n, a block (or circuit) 94 and a path 96. One or more of the circuits 92a-92n may include a process (or method) 100.

Multiple signals (e.g., OP_A to OP_N) may be exchanged between the circuit 90 and the respective circuits 92a-92n. Each signal OP_A to OP_N may convey execution operation information and/or yield operation information. Multiple signals (e.g., MEM_A to MEM_N) may be exchanged between the respective circuits 92a-92n and the circuit 94. The signals MEM_A to MEM_N may carry data. A signal (e.g., DRAM) may be exchanged between the circuit 86 and the circuit 94. The signal DRAM may transfer data between the circuits 86 and 94.

The circuit 82 may implement a processor circuit. In some embodiments, the processor circuit 82 may be a general purpose processor circuit. The processor circuit 82 may be operational to interact with the circuit 84 and the circuit 86 to perform various processing tasks.

The circuit 84 may implement a coprocessor circuit. The coprocessor circuit 84 is generally operational to perform specific (e.g., computer vision related) processing tasks as arranged by the processor circuit 82. In various embodiments, the coprocessor 84 may be implemented solely in hardware. The coprocessor 84 may directly execute a data flow directed to feature extraction and matching, including two-stage detection, generated by software that specifies processing tasks.

The circuit 86 may implement a dynamic random access memory (DRAM) circuit. The DRAM circuit 86 is generally operational to store multidimensional arrays of input data elements and various forms of output data elements. The DRAM circuit 86 may exchange the input data elements and the output data elements with the processor circuit 82 and the coprocessor circuit 84.

The circuit 90 may implement a scheduler circuit. The scheduler circuit 90 is generally operational to schedule tasks among the circuits 92a-92n to perform a variety of computer vision tasks as defined by the processor circuit 82. Individual tasks may be allocated by the scheduler circuit 90 to the circuits 92a-92n. The scheduler circuit 90 may time multiplex the tasks to the circuits 92a-92n based on the availability of the circuits 92a-92n to perform the work.

Each circuit 92a-92n may implement a processing resource (or hardware engine). The hardware engines 92a-92n are generally operational to perform specific processing tasks. In some configurations, the hardware engines 92a-92n may operate in parallel and independently of each other. In other configurations, all or a portion of the hardware engines 92a-92n may operate collectively to perform allocated tasks. The hardware engines 92a-92n may be implemented as one or more of homogenous processing resources (e.g., all circuits 92a-92n may have the same capabilities) or heterogeneous processing resources (e.g., two or more circuits 92a-92n may have different capabilities).

In various embodiments, the circuits 92a-92n may implement one or more operators. The operators performed by the hardware engines 92a-92n may include, but are not limited to, a warping operator, component operators that manipulate lists of components (e.g., components may be regions of a vector that share a common attribute and may be grouped together with a bounding box), a matrix inversion operator, a dot product operator, a convolution operator, conditional operators (e.g., multiplex and demultiplex), a remapping operator, a minimum-maximum-reduction operator, a pooling operator, a non-minimum, non-maximum suppression operator, a scanning-window based non-maximum suppression operator, a gather operator, a scatter operator, a statistics operator, a classifier operator, an integral image operator, comparison operators, indexing operators, a pattern matching operator, a feature extraction operator, a feature detection operator, a two-stage object detection operator, a score generating operator, a block reduction operator, and an upsample operator. In various embodiments, the hardware engines 92a-92n may be implemented solely as hardware circuits.

The circuit 94 may implement a shared memory circuit. The shared memory 94 is generally operational to store all, a portion, or portions of the multidimensional arrays (or vectors) of input data elements and output data elements utilized and/or generated by the hardware engines 92a-92n. The input data elements may be received from the DRAM circuit 86 via the memory bus 88. The output data elements may be sent to the DRAM circuit 86 via the memory bus 88.

The path 96 may implement a transfer path internal to the coprocessor 84. The transfer path 96 is generally operational to move data from the scheduler circuit 90 to the shared memory 94. The transfer path 96 may also be operational to move data from the shared memory 94 to the scheduler circuit 90.

The process 100 may implement a color detection process in accordance with embodiments of the invention. In various embodiments, the color detection process 100 may be performed according to the following implementation descriptions. The color detection process 100 generally consumes input images that have multiple color channels (e.g., a luminance channel and two chromainance channels). Products of the color detection process 100 may be output images with color likelihood (or probability) values for a particular color at one or more pixel locations in the input images.

Figure 2:
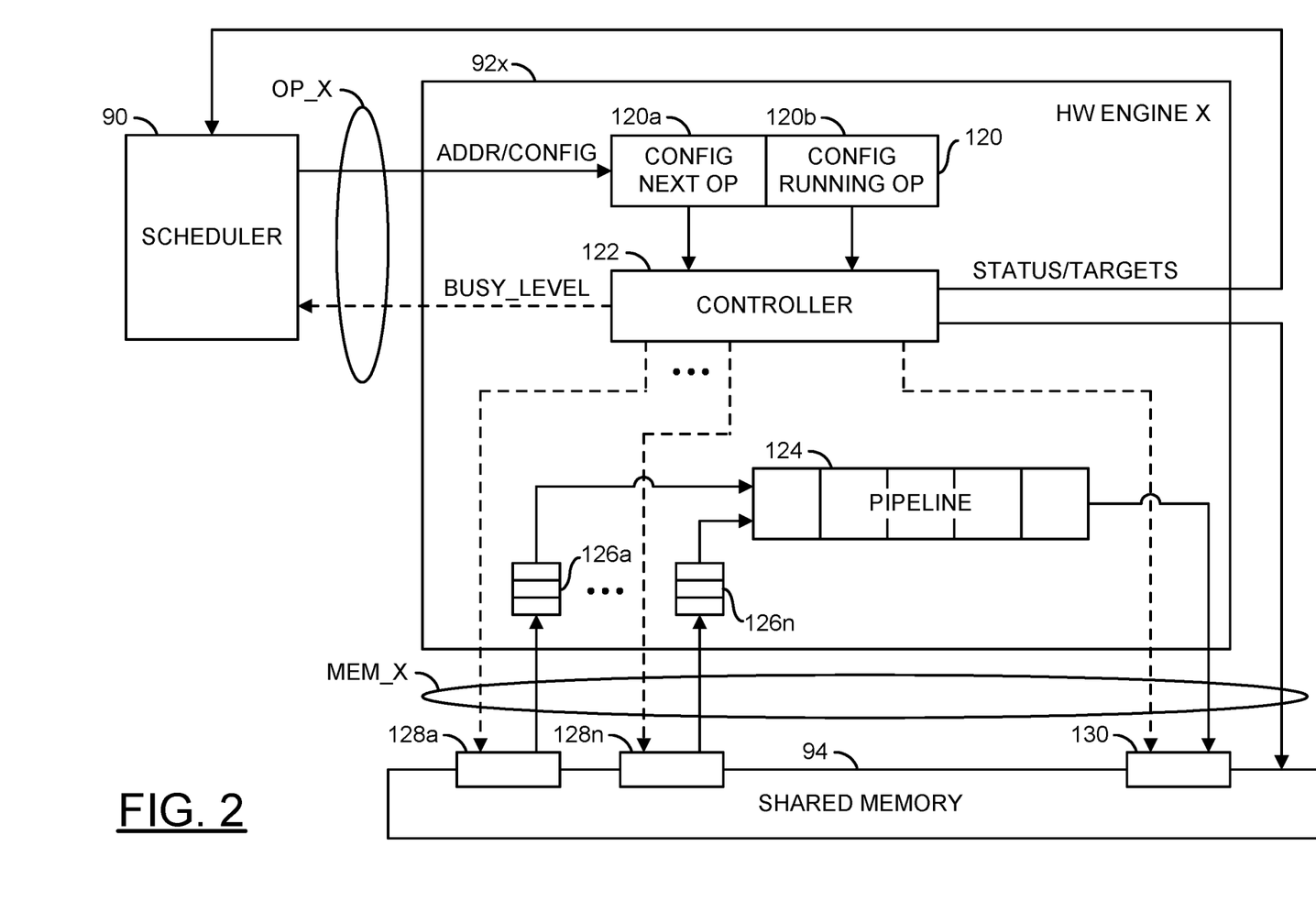
FIG. 2 is a diagram illustrating a generic implementation of a hardware engine of FIG. 1.

Referring to FIG. 2, a diagram illustrating an example implementation of a generic hardware engine 92x of FIG. 1 is shown. The hardware engine 92x may be representative of the hardware engines 92a-92n. The hardware engine 92x generally comprises a block (or circuit) 120, a block (or circuit) 122, a block (or circuit) 124, and a number of blocks (or circuits) 126a-126n. The circuit 120 may be implemented as a pair of memories (or buffers) 120a and 120b. The circuit 122 may implement a controller circuit. In an example, the circuit 122 may include one or more finite state machines (FSMs) configured to control various operators implemented by the hardware engine 92x. The circuit 124 may implement a processing pipeline of the hardware engine 92x. The circuits 126a-126n may implement first-in-first-out (FIFO) memories. The circuits 126a-126n may be configured as input buffers for the processing pipeline 124. The shared memory 94 may be configured (e.g., by signals from the circuit 122) as multiple shared input buffers 128a-128n and one or more output buffers 130.

A signal (e.g., ADDR/CONFIG) may be generated by the scheduler circuit 90 and received by the hardware engine 92x. The signal ADDR/CONFIG may carry address information and configuration data. A signal (e.g., BUSY LEVEL) may be generated by the circuit 122 and transferred to the scheduler circuit 90. The signal BUSY LEVEL may convey the busy level of the hardware engine 92x. A signal (e.g., STATUS/TARGETS) may be generated by the circuit 122 and transferred to the scheduler circuit 90. The signal STATUS/TARGETS may provide status information regarding the hardware engine 92x and target information for the operands.

In an example embodiment, the buffers 120a and 120b may be configured as a double-banked configuration buffer. The double-banked buffer may be operational to store configuration information for a currently running operation in one buffer (e.g., the buffer 120b) while configuration information for a next operation is being moved into the other buffer (e.g., the buffer 120a). The scheduler 90 generally loads operator configuration information, including status words in a case where the operator has been partially processed in previous operator chunks, into the double-banked buffer. Once the circuit 122 is finished with the configuration information of the running operation and the configuration information for the next operation has been received, the buffers 120a and 120b may swapped.

The circuit 122 generally implements the control circuitry of the hardware engine 92x. The circuit 122 determines when to switch from the currently running operator to the new operator. The controller 122 is generally operational to control the movement of information into, out of, and internal to the hardware engine 122x. In general, the operation of the hardware engine 92x is pipelined. During an operator switch, a front end of the pipeline 124 may already be working on data for the new operator while a tail-end of the pipeline 124 is still finishing up the processing associated with old operator.

The circuit 124 may implement a pipeline circuit. The pipeline circuit 124 is generally operational to process operands received from the shared memory 94 using functionality designed into the hardware engine 92x. The circuit 124 may communicate data resulting from the functions performed to the one or more shared buffers 130.

The buffers 126a-126n may implement FIFO buffers. The FIFO buffers 126a-126n may be operational to store operands received from the shared buffers 128a-128n for processing in the pipeline 124. In general, the number of FIFO buffers and the number of shared buffers implemented may be varied to meet the design criteria of a particular application.

Figure 3:
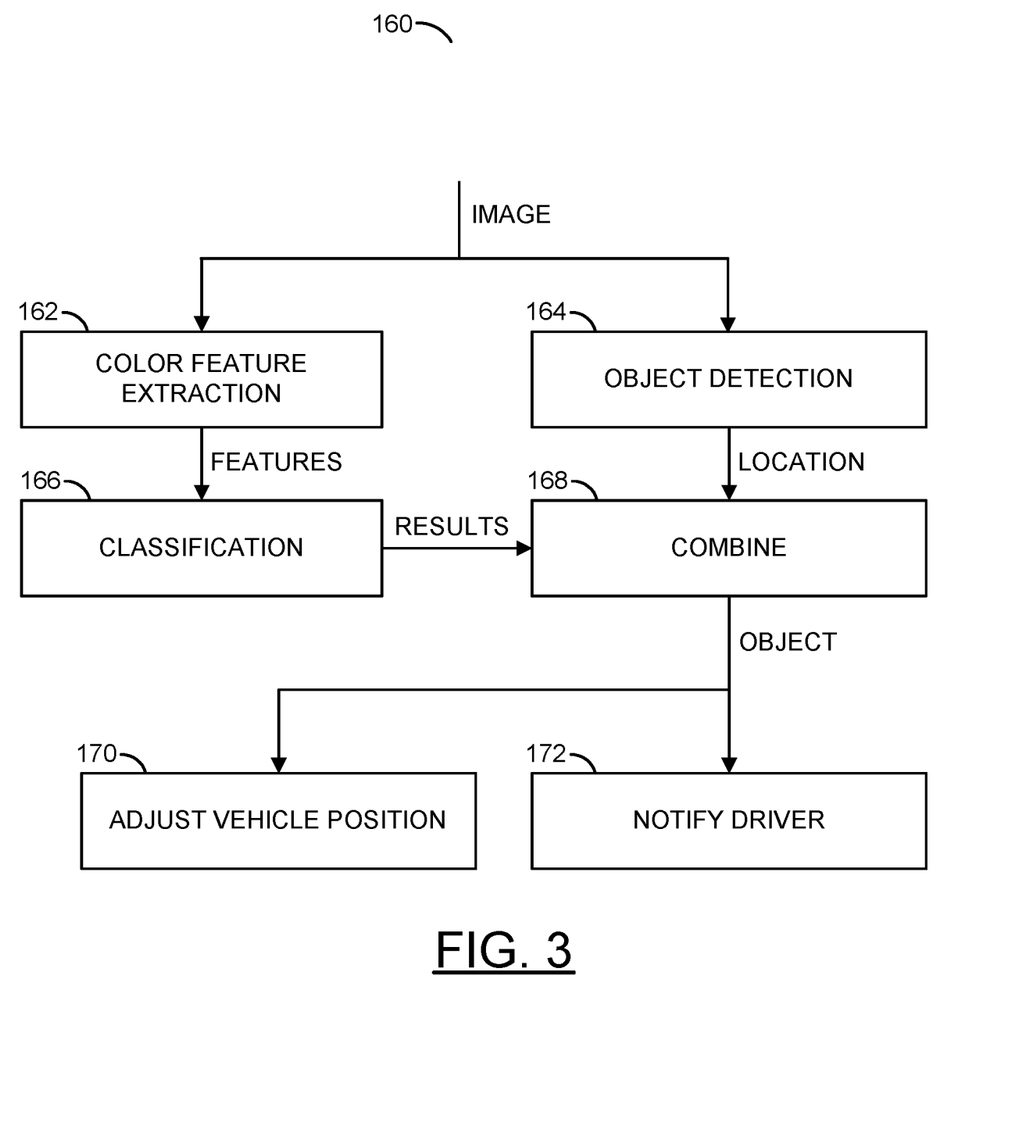
FIG. 3 is a flow diagram for real-time land mark detection and color classification for street vehicles.

Referring to FIG. 3, a flow diagram of an example implementation of a method 160 for real-time land mark detection and color classification for street vehicles is shown. The method (or process) 160 may be implemented by the system 80 and in additional processing resources. The method 160 generally comprises a step (or state) 162, a step (or state) 164, a step (or state) 166, a step (or state) 168, a step (or state) 170 and a step (or state) 172. The sequence of the steps 162 to 172 is shown as a representative example. Other step orders may be implemented to meet the criteria of a particular application.

In the step 162, the system 80 may perform a color feature extraction process. The color feature extraction process 162 is generally operational to determine a color likelihood value that pixels in each pixel location of an input image (e.g., IMAGE) have a specific color. In various embodiments, the specific color may be the shade of yellow used in streets and highways to identify the center and/or edges of traffic lanes and/or other road marks. In other embodiments, the specific color may be the shade of white used the streets and highways for similar reasons. Generally, the specific color may be any color commonly applied to roadway markings, traffic lights and/or traffic signs. The step 162 may also reject colors that are commonly associated with pavement repair, such as black asphalt. A result of the step 162 may be a set of multiple (e.g., 16) features for each pixel of interest. The features may be presented to the step 168 (e.g., FEATURES). The input image is typically generated by warping an original image taken by an on-dash mounted camera through an inverse perspective mapping.

In the step 164, the system 80 may perform an object detection process. The object detection process 164 is generally operational to determine locations of one or more objects (e.g., lane marks, road markings, traffic signs, traffic lights, etc.) within the input images. A location of each detected object (e.g., LOCATION) may be presented to the step 168. The step 164 may be performed in parallel with, or sequentially with the step 162.

The step 166 may implement a color classification step. The color classification step 166 is generally operational to determine a color likelihood value for one or more pixel locations in the input images. The color likelihood values generally define a probability that a particular pixel location is approximately similar to or matches the specified color (e.g., red, green, yellow or white). A result of the step 166 (e.g., RESULTS) may be arrays (or probability maps) of color likelihood values that indicates a confidence in the color at each pixel location. The resulting arrays may be presented to the step 168. In some embodiments, pixel locations different from the specified color may be segmented out of the map by applying a threshold to each color likelihood value. For example, the color likelihood values below a threshold (e.g., pixels below the top N % classification probability) may be set to a default probability value (e.g., zero). The resulting map may subsequently be presented to the step 168. In various embodiments, the top N % classification probability may be from the top 12% to the top 17%. Other top percentages may be implemented to meet the design criteria of a particular application.

The step 168 may implement a combination step. The combination step 168 is generally operational to combine the locations of the objects determined by the object detection step 164 with the color likelihood value arrays from the classification step 168. Based on the location(s) of the detected objects and the probable colors of the detected objects, the step 168 may determine a location of the vehicle relative to the objects (e.g., within a lane). The object location (e.g., OBJECT) may be presented to the steps 170 and 172.

In the step 170, the additional processing resources may generate driving commands to adjust the position of the vehicle relative to the object based on a position of the vehicle. For example, where the objects are lane marks, the driving commands may be designed to maintain the vehicle as set distance to a side of detected lane marks. In some embodiments, the driving commands may be designed to center the vehicle between pairs of detected lane marks.

The step 172 may provide notifications to a driver of the vehicle in response to a driving-related situation. For example, the driver may be notified when the vehicle is too close to a detected lane marker (e.g., a lane situation). In another example, the driver may be notified when the vehicle is approaching a stop sign at a high speed (e.g., a sign situation). The notifications may be in the form of an audio message (e.g., a tone or recorded message) and/or a visual message (e.g., a warning light and/or text on a display).

Figure 4:
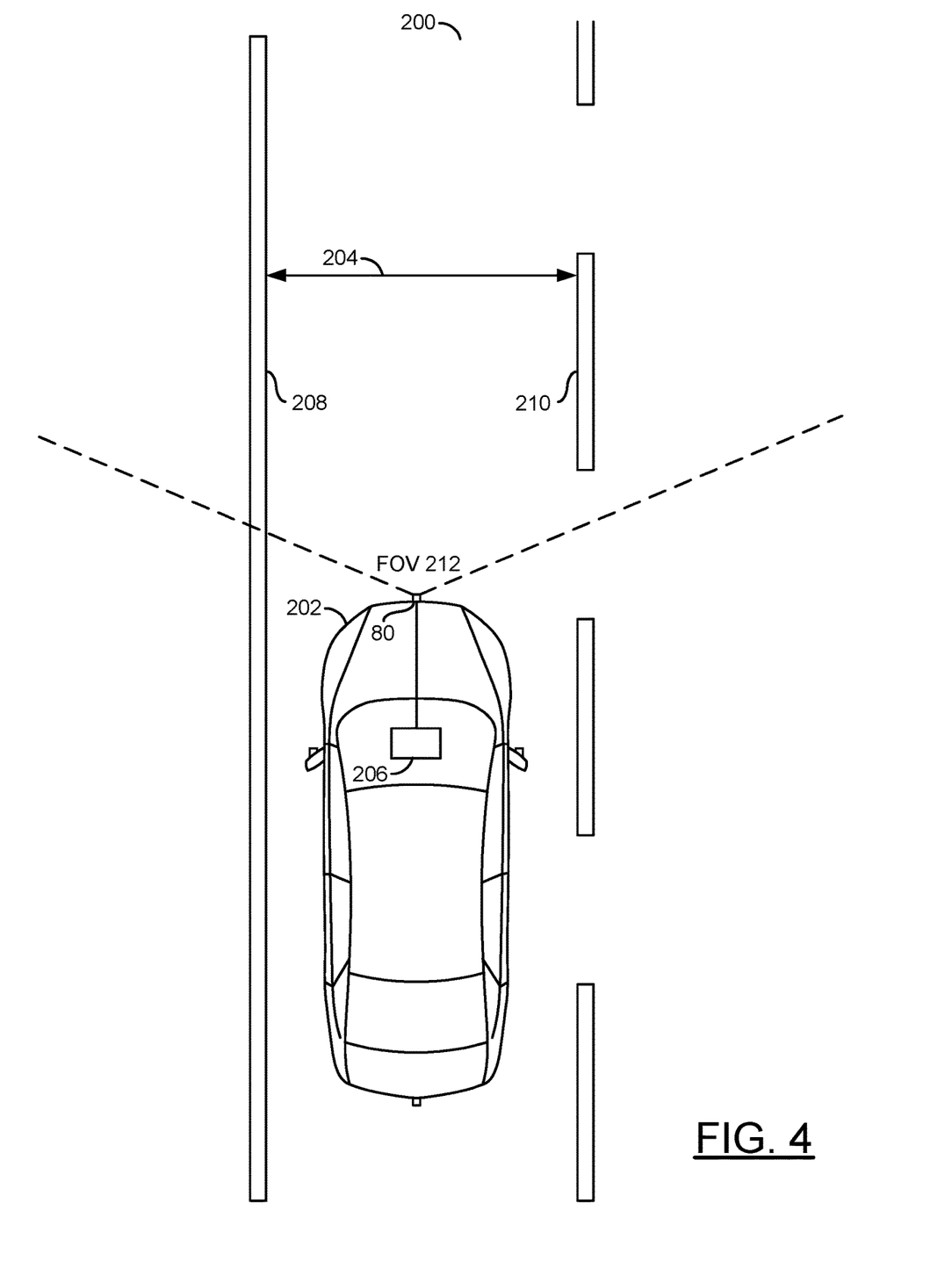
FIG. 4 is a diagram of an example birds-eye view of a vehicle in a lane.

Referring to FIG. 4, a diagram 200 of an example birdseye view of a vehicle 202 in a lane 204 is shown. The vehicle 202 generally comprises the system 80 and additional processing resources 206. In some embodiments, the additional processing resources 206 may comprise multiple copies of the system 80. By way of example, the lane 204 generally comprises a left-edge lane mark 208 and an inter-lane mark 210. An optical field of view (FOV) 212 of the system 80 may be sufficiently wide for the system 80 to see both lane marks 208 and 210 when the vehicle 202 is at any position within the lane 204.

The processing resources 206 may be operational to provide an autonomous driving capability to the vehicle 202. The processing resources 206 are generally operational to control at least an engine speed, a transmission selection, braking and steering of the vehicle 202 (e.g., the step 170 in FIG. 3). The processing resources 206 may receive lane location information from the system 80.

Figure 5:
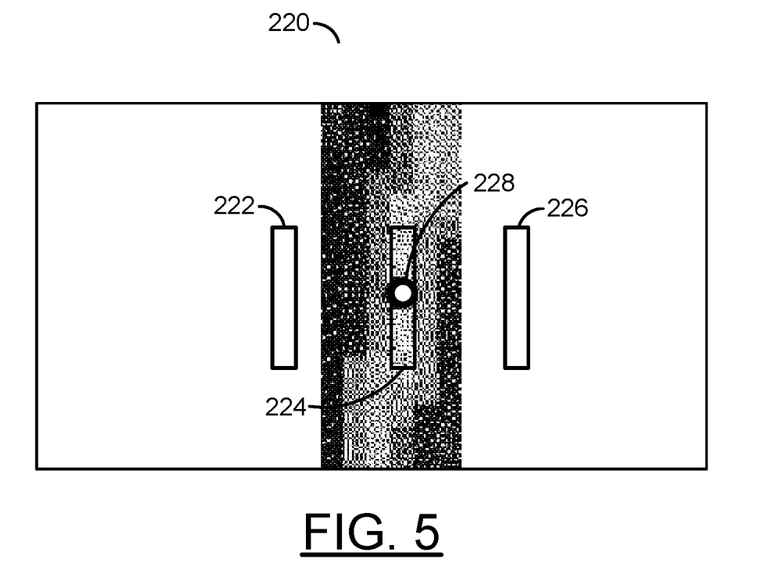
FIG. 5 is a diagram of an input image.

Referring to FIG. 5, a diagram of an example input image 220 is shown. The input image 220 may be processed by the system to determine color features, color classification, lane detection and color classification/lane detection combination. The color detection process 100 generally utilizes a portion of the input image 220 at any given time. In some embodiments, multiple (e.g., three) windows (or areas) 222, 224 and 226 may be considered by the color detection process 100. A center window 224 may include a pixel of interest 228. The pixel of interest 228 may be a current pixel location being color classified. The windows 222 and 226 are generally designed to represent a local context and contrast around the pixel of interest 228.

Figure 6:
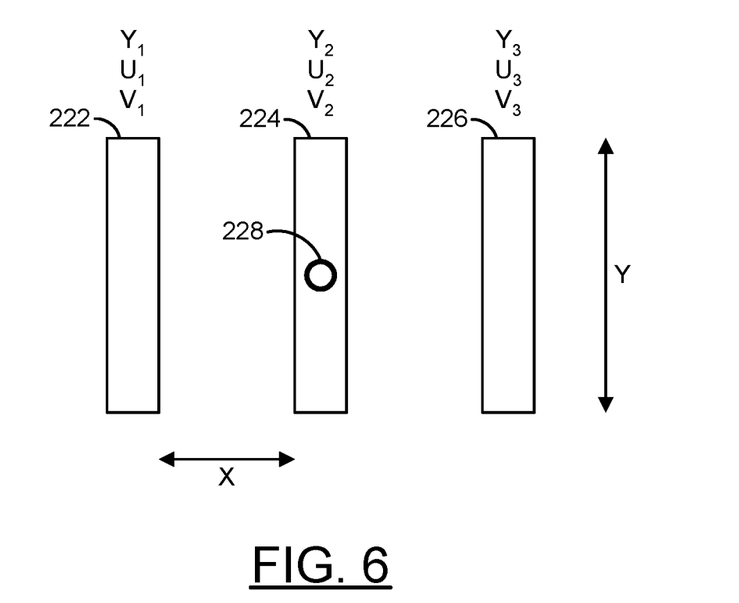
FIG. 6 is a diagram of a layout of sample windows.

Referring to FIG. 6, a diagram of an example layout of the windows 222, 224 and 226 is shown. The window 222 may be located several (e.g., X) pixel columns to one side (e.g., a left side) of the center window 224. The window 226 may be located X pixel columns to another side (e.g., a right side) of the center window 224, opposite the window 222. In some embodiments, the distance X may be 5 pixel widths. Other distances X may be implemented to meet the design criteria of a particular application.

Each window 222, 224 and 226 may be one or more pixels wide (e.g., horizontal). In various embodiments, each window 222, 224 and 226 may be a single pixel wide. The windows 222, 224 and 226 may each be several (e.g., Y) pixels tall. In some embodiments, the height Y may be 6 pixels. Other heights Y may be implemented to meet the design criteria of a particular application. The pixel of interest 228 may be located approximately halfway between a top and a bottom of the window 224.

The pixels of the input image 220 may each be represented as components in multiple color channels. In some designs, the color channels may include a luminance channel (e.g., A) and two chrominance channels (e.g., B and C). In various embodiments, the channels ABC may be representative of YUV, $YC_bC_r$, $YP_bP_r$, RGB, sRGB or YIQ color models. Other color models may be implemented to meet the design criteria of a particular application.

Consider the YUV color model, the pixels within the window 222 generally have an average luminance value (e.g., $Y_1$), an average chrominance value (e.g., $U_1$) and another average chrominance value (e.g., $V_1$). The pixels within the window 224 generally have an average luminance value (e.g., $Y_2$), an average chrominance value (e.g., $U_2$) and another average chrominance value (e.g., $V_2$). The pixels within the window 226 generally have an average luminance value (e.g., $Y_3$), an average chrominance value (e.g., $U_3$) and another average chrominance value (e.g., $V_3$).

Figure 7:
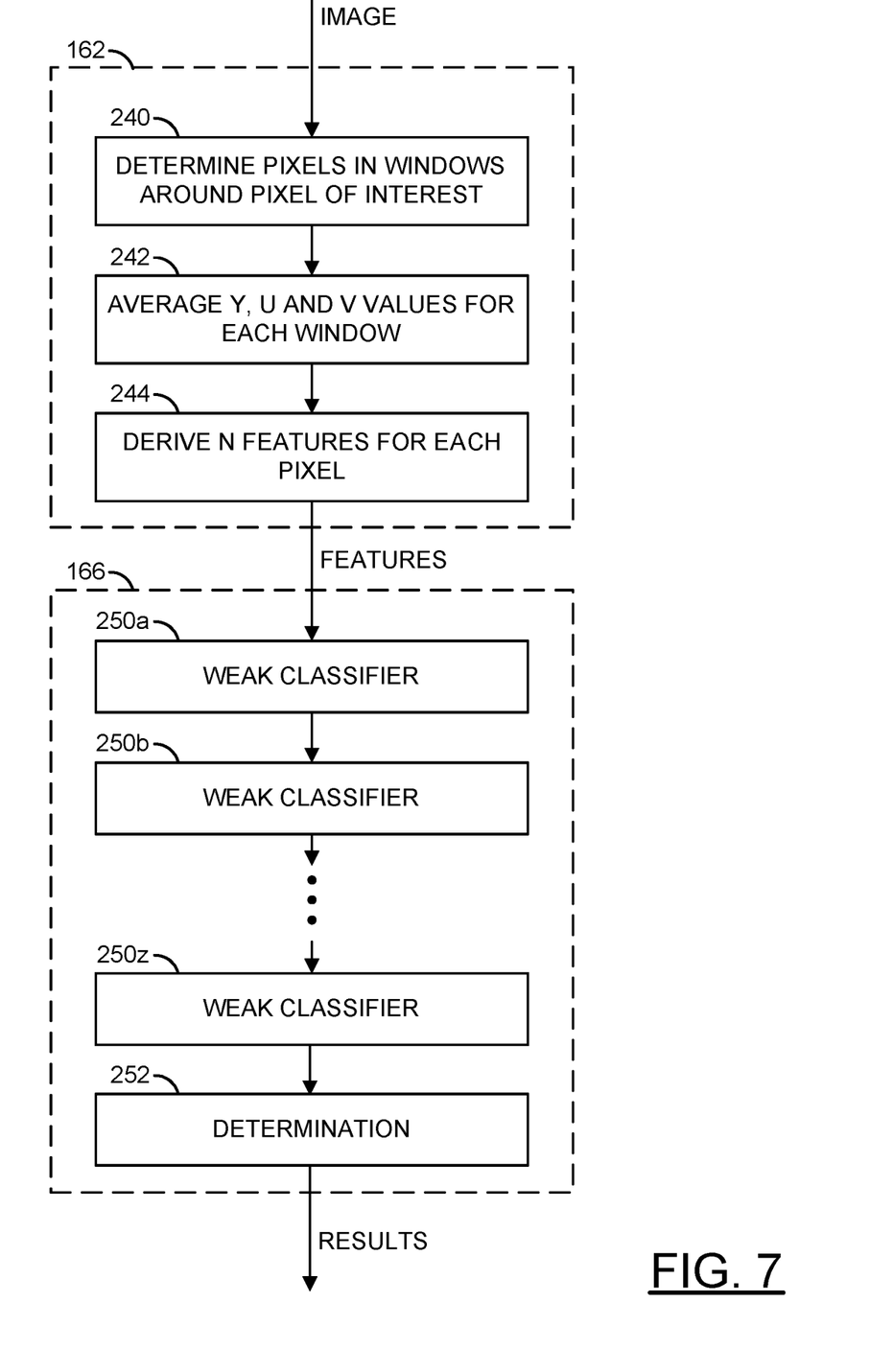
FIG. 7 is of a flow diagram of a color feature extraction and a classification step.

Referring to FIG. 7, a flow diagram of an example detailed implementation of the color feature extraction step 162 and the classification step 166 is shown. The step 162 generally comprises a step (or state) 240, a step (or state) 242 and a step (or state) 244. The step 166 generally comprises multiple steps (or states) 250a-250z and a step (or state) 252. The steps 240 to 252 may be performed by the color detection process 100. The sequence of the steps 240 to 252 is shown as a representative example. Other step orders may be implemented to meet the criteria of a particular application.

In the step 240, the color detection process 100 may receive a portion of or all of the input image 220. The color detection process 100 may subsequently determine the pixels of the input image 220 that are within the windows 222, 224 and 226 around the pixel of interest 228. In the step 242, the color detection process 100 may be operational to generate the average luminance value Y and chrominance values U and V for each of the windows 222, 224 and 226. The average values for Y, U and V may be calculated by filtering each of the three color channels using a Y×1 average filter. From the 9 resulting YUV values, multiple (e.g., Z) features may be derived for each pixel of interest 228 by the color detection process 100 in the step 244. In various embodiments, the Z features may comprise 16 features. Calculations of the features are generally provided as follows:

Feature $A=Y_2$,
Feature $B=U_2$,
Feature $C=V_2$,
Feature $D=V_2/U_2$,
Feature $E=V_2-U_2$,
Feature $F=(Y_1+Y_3)/2$,
Feature $G=(U_1+U_3)/2$,
Feature $H=(V_1+V_3)/2$,
Feature $I=((V_1/U_1)+(V_3/U_3))/2$,
Feature $J=(V_1-U_1+V_3-U_3)/2$,
Feature $K=(2\times Y_2)-Y_1-Y_3$,
Feature $L=(2\times U_2)-U_1-U_3$,
Feature $M=(2\times V_2)-V_1-V_3$,
Feature $N=(2\times Y_2)/(Y_1+Y_3)$,
Feature $O=(2\times U_2)/(U_1+U_3)$, and
Feature $P=(2\times V_2)/(V_1+V_3)$.

In various embodiments, the step 166 may implement a common Adaboost classifier technique. Specifically, the Adaboost classifier technique combines multiple (e.g., Z) weak depth-two decision trees 250a-250z in a cascade to form a strong classifier. During training, each node of the weak classifiers 250a-250z may select one of the Z features that best separates training samples of different categories. The determination process 252 may generate the color likelihood values that indicates a confidence in the color at each pixel location in the signal RESULTS. Other classifier techniques may be implemented to meet the design criteria of a particular application.

Figure 8:
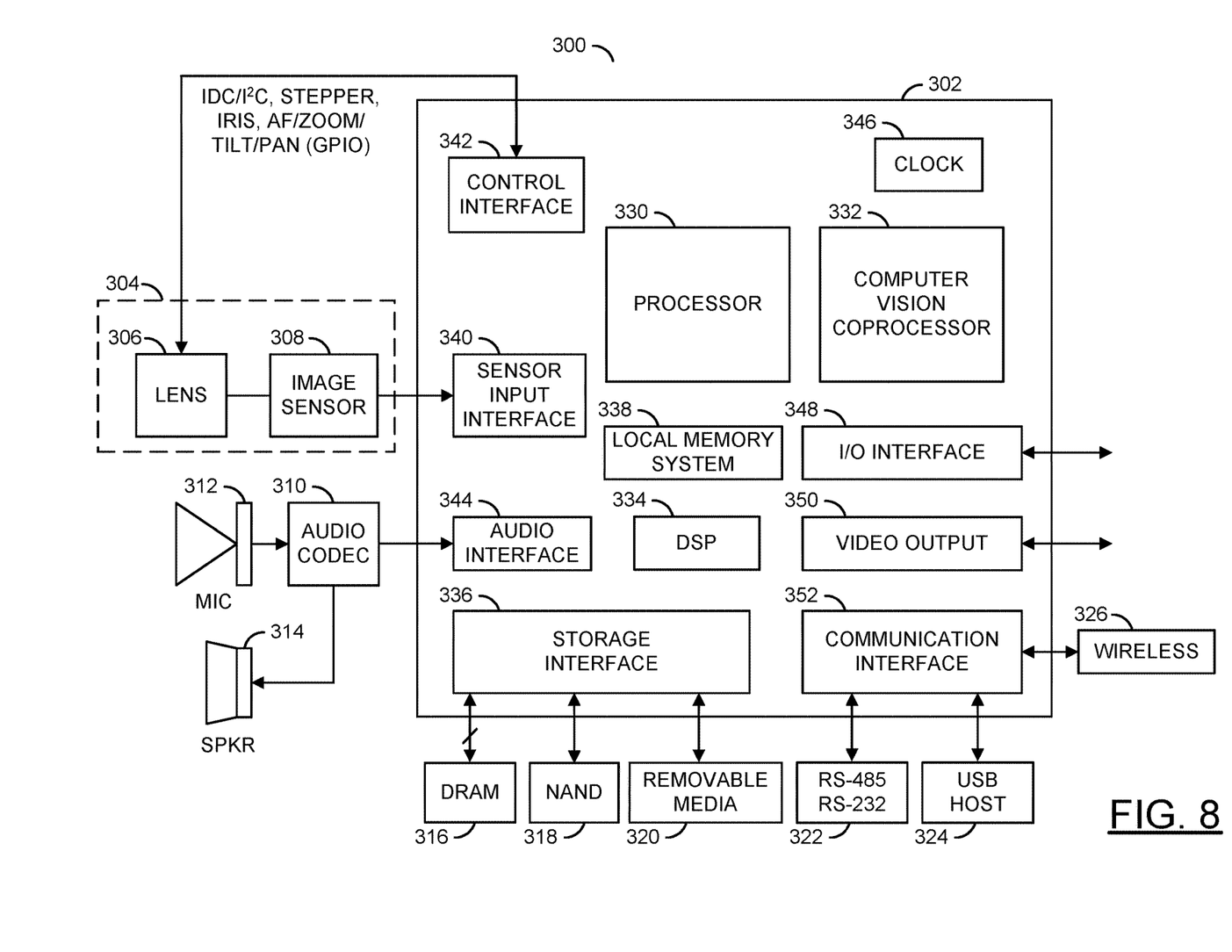
FIG. 8 is a diagram illustrating a camera system incorporating the color detection process.

Referring to FIG. 8, a diagram of a camera system 300 is shown illustrating an example implementation of a computer vision system in accordance with an embodiment of the invention. In one example, the electronics of the camera system 300 may be implemented as one or more integrated circuits. In an example, the camera system 300 may be built around a processor/camera chip (or circuit) 302. In an example, the processor/camera chip 302 may be implemented as an application specific integrated circuit (ASIC) or system on chip (SOC). The processor/camera circuit 302 generally incorporates hardware and/or software/firmware that may be configured to implement the processors, circuits, and processes described above in connection with FIG. 1 through FIG. 7.

In an example, the processor/camera circuit 302 may be connected to a lens and sensor assembly 304. In some embodiments, the lens and sensor assembly 304 may be a component of the processor/camera circuit 302 (e.g., a SoC component). In some embodiments, the lens and sensor assembly 304 may be a separate component from the processor/camera circuit 302 (e.g., the lens and sensor assembly may be an interchangeable component compatible with the processor/camera circuit 302). In some embodiments, the lens and sensor assembly 304 may be part of a separate camera connected to the processor/camera circuit 302 (e.g., via a video cable, a high definition media interface (HDMI) cable, a universal serial bus (USB) cable, an Ethernet cable, or wireless link).

The lens and sensor assembly 304 may comprise a block (or circuit) 306 and/or a block (or circuit) 308. The circuit 306 may be associated with a lens assembly. The circuit 308 may be an image sensor. The lens and sensor assembly 304 may comprise other components (not shown). The number, type and/or function of the components of the lens and sensor assembly 304 may be varied according to the design criteria of a particular implementation.

The lens assembly 306 may capture and/or focus light input received from the environment near the camera 300. The lens assembly 306 may capture and/or focus light for the image sensor 308. The lens assembly 306 may implement an optical lens. The lens assembly 306 may provide a zooming feature and/or a focusing feature. The lens assembly 306 may be implemented with additional circuitry (e.g., motors) to adjust a direction, zoom and/or aperture of the lens assembly 306. The lens assembly 306 may be directed, tilted, panned, zoomed and/or rotated to provide a targeted view of the environment near the camera 300.

The image sensor 308 may receive light from the lens assembly 306. The image sensor 308 may be configured to transform the received focused light into digital data (e.g., bitstreams). In some embodiments, the image sensor 308 may perform an analog to digital conversion. For example, the image sensor 308 may perform a photoelectric conversion of the focused light received from the lens assembly 306. The image sensor 308 may present converted image data as a color filter array (CFA) formatted bitstream. The processor/camera circuit 302 may transform the bitstream into video data, video files and/or video frames (e.g., human-legible content).

The processor/camera circuit 302 may also be connected to (i) an optional audio input/output circuit including an audio codec 310, a microphone 312, and a speaker 314, (ii) a memory 316, which may include dynamic random access memory (DRAM), (iii) a nonvolatile memory (e.g., NAND flash memory) 318, a removable media (e.g., SD, SDXC, etc.) 320, one or more serial (e.g., RS-485, RS-232, etc.)

devices 322, one or more universal serial bus (USB) devices (e.g., a USB host) 324, and a wireless communication device 326.

In various embodiments, the processor/camera circuit 302 may comprise a block (or circuit) 330, a block (or circuit) 332, a block (or circuit) 334, a block (or circuit) 336, a block (or circuit) 338, a block (or circuit) 340, a block (or circuit) 342, a block (or circuit) 344, a block (or circuit) 346, a block (or circuit) 348, a block (or circuit) 350, and/or a block (or circuit) 352. The circuit 330 may be a processor circuit. In various embodiments, the circuit 330 may include one or more embedded processors (e.g., ARM, etc.). The circuit 332 may be a computer vision coprocessor circuit. The circuit 334 may be a digital signal processing (DSP) module. In some embodiments, the circuit 334 may implement separate image DSP and video DSP modules. The circuit 336 may be a storage interface. The circuit 336 may interface the processor/camera circuit 302 with the DRAM 316, the nonvolatile memory 318, and the removable media 320.

The circuit 338 may implement a local memory system. In some embodiments, the local memory system 338 may include, but is not limited to a cache (e.g., L2CACHE), a direct memory access (DMA) engine, graphic direct memory access (GDMA) engine, and fast random access memory. The circuit 340 may implement a sensor input (or interface). The circuit 342 may implement one or more control interfaces including but not limited to an inter device communication (IDC) interface, an inter integrated circuit (I²C) interface, a serial peripheral interface (SPI), and a pulse width modulation (PWM) interface. The circuit 344 may implement an audio interface (e.g., an I²S interface, etc.). The circuit 346 may implement a clock circuit including but not limited to a real time clock (RTC), a watchdog timer (WDT), and/or one or more programmable timers. The circuit 348 may implement an input/output (I/O) interface. The circuit 350 may be a video output module. The circuit 352 may be a communication module. The circuits 330 through 352 may be connected to each other using one or more buses, interfaces, traces, protocols, etc.

The circuit 318 may be implemented as a nonvolatile memory (e.g., NAND flash memory, NOR flash memory, etc.). The circuit 320 may comprise one or more removable media cards (e.g., secure digital media (SD), secure digital extended capacity media (SDXC), etc.). The circuit 322 may comprise one or more serial interfaces (e.g., RS-485, RS-232, etc.). The circuit 324 may be an interface for connecting to or acting as a universal serial bus (USB) host. The circuit 326 may be a wireless interface for communicating with a user device (e.g., a smart phone, a computer, a tablet computing device, cloud resources, etc.). In various embodiments, the circuits 304-326 may be implemented as components external to the processor/camera circuit 302. In some embodiments, the circuits 304-326 may be components on-board the processor/camera circuit 302.

The control interface 342 may be configured to generate signals (e.g., IDC/I2C, STEPPER, IRIS, AF/ZOOM/TILT/PAN, etc.) for controlling the lens and sensor assembly 304. The signal IRIS may be configured to adjust an iris for the lens assembly 306. The interface 342 may enable the processor/camera circuit 302 to control the lens and sensor assembly 304.

The storage interface 336 may be configured to manage one or more types of storage and/or data access. In one example, the storage interface 336 may implement a direct memory access (DMA) engine and/or a graphics direct memory access (GDMA). In another example, the storage interface 336 may implement a secure digital (SD) card interface (e.g., to connect to the removable media 320). In various embodiments, programming code (e.g., executable instructions for controlling various processors and encoders of the processor/camera circuit 302) may be stored in one or more of the memories (e.g., the DRAM 316, the NAND 318, etc.). When executed by the processor 330, the programming code generally causes one or more components in the processor/camera circuit 302 to configure video synchronization operations and start video frame processing operations. The resulting compressed video signal may be presented to the storage interface 336, the video output 350 and/or communication interface 352. The storage interface 336 may transfer program code and/or data between external media (e.g., the DRAM 316, the NAND 318, the removable media 320, etc.) and the local (internal) memory system 338.

The sensor input 340 may be configured to send/receive data to/from the image sensor 308. In one example, the sensor input 340 may comprise an image sensor input interface. The sensor input 340 may be configured to transmit captured images (e.g., picture element, pixel, data) from the image sensor 308 to the DSP module 334, the processor 330 and/or the coprocessor 332. The data received by the sensor input 340 may be used by the DSP 334 to determine a luminance (Y) and chrominance (U and V) values from the image sensor 308. The sensor input 340 may provide an interface to the lens and sensor assembly 304. The sensor input interface 340 may enable the processor/camera circuit 302 to capture image data from the lens and sensor assembly 304.

The audio interface 344 may be configured to send/receive audio data. In one example, the audio interface 344 may implement an audio inter-IC sound (I²S) interface. The audio interface 344 may be configured to send/receive data in a format implemented by the audio codec 310.

The DSP module 334 may be configured to process digital signals. The DSP module 334 may comprise an image digital signal processor (IDSP), a video digital signal processor DSP (VDSP) and/or an audio digital signal processor (ADSP). The DSP module 334 may be configured to receive information (e.g., pixel data values captured by the image sensor 308) from the sensor input 340. The DSP module 334 may be configured to determine the pixel values (e.g., RGB, YUV, luminance, chrominance, etc.) from the information received from the sensor input 340. The DSP module 334 may be further configured to support or provide a sensor RGB to YUV raw image pipeline to improve image quality, bad pixel detection and correction, demosaicing, white balance, color and tone correction, gamma correction, adjustment of hue, saturation, brightness and contrast adjustment, chrominance and luminance noise filtering.

The I/O interface 348 may be configured to send/receive data. The data sent/received by the I/O interface 348 may be miscellaneous information and/or control data. In one example, the I/O interface 348 may implement one or more of a general purpose input/output (GPIO) interface, an analog-to-digital converter (ADC) module, a digital-to-analog converter (DAC) module, an infrared (IR) remote interface, a pulse width modulation (PWM) module, a universal asynchronous receiver transmitter (UART), an infrared (IR) remote interface, and/or one or more synchronous data communications interfaces (IDC SPI/SSI).

The video output module 350 may be configured to send video data. For example, the processor/camera circuit 302 may be connected to an external device (e.g., a TV, a monitor, a laptop computer, a tablet computing device, etc.). The video output module 350 may implement a high-definition multimedia interface (HDMI), a PAL/NTSC interface, an LCD/TV/Parallel interface and/or a DisplayPort interface.

The communication module 352 may be configured to send/receive data. The data sent/received by the communication module 352 may be formatted according to a particular protocol (e.g., Bluetooth®, ZigBee®, USB, Wi-Fi, UART, etc.). In one example, the communication module 352 may implement a secure digital input output (SDIO) interface. The communication module 352 may include support for wireless communication by one or more wireless protocols such as Bluetooth®, ZigBee®, Institute of Electrical and Electronics Engineering (IEEE) 802.11, IEEE 802.15, IEEE 802.15.1, IEEE 802.15.2, IEEE 802.15.3, IEEE 802.15.4, IEEE 802.15.5, and/or IEEE 802.20, GSM, CDMA, GPRS, UMTS, CDMA2000, 3GPP LTE, 4G/HSPA/WiMAX, SMS, etc. The communication module 352 may also include support for communicating using one or more of the universal serial bus protocols (e.g., USB 1.0, 2.0, 3.0, etc.). The processor/camera circuit 302 may also be configured to be powered via a USB connection. However, other communication and/or power interfaces may be implemented accordingly to meet the design criteria of a particular application.

The processor/camera circuit 302 may be configured (e.g., programmed) to control the one or more lens assemblies 306 and the one or more image sensors 308. The processor/camera circuit 302 may receive raw image data from the image sensor(s) 308. The processor/camera circuit 302 may encode the raw image data into a plurality of encoded video streams simultaneously (in parallel). The plurality of video streams may have a variety of resolutions (e.g., VGA, WVGA, QVGA, SD, HD, Ultra HD, 4K, etc.). The processor/camera circuit 302 may receive encoded and/or uncoded (e.g., raw) audio data at the audio interface 344. The processor/camera circuit 302 may also receive encoded audio data from the communication interface 352 (e.g., USB and/or SDIO). The processor/camera circuit 302 may provide encoded video data to the wireless interface 326 (e.g., using a USB host interface). The wireless interface 326 may include support for wireless communication by one or more wireless and/or cellular protocols such as Bluetooth®, ZigBee®, IEEE 802.11, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, SMS, etc. The processor/camera circuit 302 may also include support for communication using one or more of the universal serial bus protocols (e.g., USB 1.0, 2.0, 3.0, etc.).

The system 80 generally provides a feature descriptor technique with multiple (e.g., 16) discriminative features that may be efficiently computed. When combined with the Adaboost classifier process, the feature descriptor may achieve good object (e.g., lane marking detection) and color classification accuracy. The simplicity and efficiency of the color detection technique may be well suited for embedded environments and time-critical applications, such as self-driving car. The color detection method is generally a learning-based solution trained off-line from tens of thousands of images, taken under many different scenarios and lighting conditions, and annotated by human experts for lane markings, and is therefore robust.

The functions and structures illustrated in the diagrams of FIGS. 1 to 8 may be designed, modeled, emulated, and/or simulated using one or more of a conventional general purpose processor, digital computer, microprocessor, microcontroller, distributed computer resources and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example non-transitory storage media, and may be executed by one or more of the processors sequentially or in parallel.

Embodiments of the present invention may also be implemented in one or more of ASICs (application specific integrated circuits), FPGAs (field programmable gate arrays), PLDs (programmable logic devices), CPLDs (complex programmable logic device), sea-of-gates, ASSPs (application specific standard products), and integrated circuits. The circuitry may be implemented based on one or more hardware description languages. Embodiments of the present invention may be utilized in connection with flash memory, nonvolatile memory, random access memory, read-only memory, magnetic disks, floppy disks, optical disks such as DVDs and DVD RAM, magneto-optical disks and/or distributed storage systems.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
   a memory configured to store an input image of road markings, said input image having a plurality of color channels; and
   a circuit configured to (i) calculate, for each pixel of said input image, a plurality of average values of each of said color channels for pixels in (a) a first window, (b) a second window containing a current pixel of interest and spatially separated from said first window by a number of pixel columns, and (c) a third window spatially separated from said second window by said number of pixel columns, wherein said plurality of average values comprise a first set of three average values ($A_1$, $B_1$, and $C_1$) corresponding to said first window, a second set of three average values ($A_2$, $B_2$, and $C_2$) corresponding to said second window, and a third set of three average values ($A_3$, $B_3$, and $C_3$) corresponding to said third window, (ii) calculate a feature descriptor comprising a plurality of feature values based on said average values of said first, said second, and said third windows for each pixel, wherein a first of said feature values is set to $A_2$, a second of said feature values is set to $B_2$, a third of said feature values is set to $C_2$, a fourth of said feature values is calculated as $C_2/A_2$, and a fifth of said feature values is calculated as $C_2-B_2$, and (iii) generate a plurality of likelihood values expressing a likelihood of a specific color road marking at each pixel location of said input image using said feature values of said feature descriptor of each pixel in a color classification process combining multiple weak depth-two decision trees in a cascade to form a strong classifier.

2. The apparatus according to claim 1, wherein said memory and said circuit are part of a real-time lane mark detection system configured to generate one or more of (i) a visual notification of a lane situation, (ii) an audio notification of said lane situation, or (iii) both said visual and said audio notifications of said lane situation based on said likelihood values.

3. The apparatus according to claim 1, wherein said first window and said third window represent a local context and contrast around said second window.

4. The apparatus according to claim 1, wherein said calculation of said average values comprises:
 filtering each of a plurality of color-space components of pixels in said first window to generate said first set of three average values ($A_1$, $B_1$ and $C_1$);
 filtering each of said color-space components of pixels in said second window to generate said second set of three average values ($A_2$, $B_2$ and $C_2$); and
 filtering each of said color-space components of pixels in said third window to generate said third set of three average values ($A_3$, $B_3$ and $C_3$).

5. The apparatus according to claim 1, wherein calculating said feature descriptor for each pixel further comprises:
 calculating one of said feature values as $(A_1+A_3)/2$.

6. The apparatus according to claim 1, wherein calculating said feature descriptor for each pixel further comprises:
 calculating one of said feature values as $(B_1+B_3)/2$.

7. The apparatus according to claim 1, wherein calculating said feature descriptor for each pixel further comprises:
 calculating one of said feature values as $(C_1+C_3)/2$.

8. The apparatus according to claim 1, wherein calculating said feature descriptor for each pixel further comprises:
 calculating one of said feature values as $((C_1/B_1)+(C_3/B_3))/2$.

9. The apparatus according to claim 1, wherein calculating said feature descriptor for each pixel further comprises:
 calculating one of said feature values as $(C_1-B_1+C_3-B_3)/2$.

10. The apparatus according to claim 1, wherein calculating said feature descriptor for each pixel further comprises:
 calculating one of said feature values as $(2\times A_2)-A_1-A_3$.

11. The apparatus according to claim 1, wherein calculating said feature descriptor for each pixel further comprises:
 calculating one of said feature values as $(2\times B_2)-B_1-B_3$.

12. The apparatus according to claim 1, wherein calculating said feature descriptor for each pixel further comprises:
 calculating one of said feature values as $(2\times C_2)-C_1-C_3$.

13. The apparatus according to claim 1, wherein calculating said feature descriptor for each pixel further comprises:
 calculating one of said feature values as $(2\times A_2)/(A_1+A_3)$.

14. The apparatus according to claim 1, wherein calculating said feature descriptor for each pixel further comprises:
 calculating one of said feature values as $(2\times B_2)/(B_1+B_3)$.

15. The apparatus according to claim 1, wherein calculating said feature descriptor for each pixel further comprises:
 calculating one of said feature values as $(2\times C_2)/(C_1+C_3)$.

16. A method for color classification, comprising the steps of:
 storing in a memory an input image of road markings, said input image having a plurality of color channels;
 calculating in a circuit, for each pixel of said input image, a plurality of average values of each of said color channels for pixels in (a) a first window, (b) a second window containing a current pixel of interest and spatially separated from said first window by a number of pixel columns, and (c) a third window spatially separated from said second window by said number of pixel columns, wherein said plurality of average values comprise a first set of three average values ($A_1$, $B_1$, and $C_1$) corresponding to said first window, a second set of three average values ($A_2$, $B_2$ and $C_2$) corresponding to said second window, and a third set of three average values ($A_3$, $B_3$, and $C_3$) corresponding to said third window;
 calculating a feature descriptor comprising a plurality of feature values based on said average values of said first, said second, and said third windows for each pixel, wherein said feature descriptor of each pixel comprises sixteen discriminative feature values calculated based on the nine average values $A_1$, $B_1$, $C_1$, $A_2$, $B_2$, $C_2$, $A_3$, $B_3$, and $C_3$; and
 generating a plurality of likelihood values expressing a likelihood of a specific color road marking at each pixel location of said input image using said feature values of said feature descriptor of each pixel in a color classification process combining multiple weak depth-two decision trees in a cascade to form a strong classifier.

17. The method according to claim 16, wherein said method is implemented in a real-time lane mark detection system configured to generate one or more of (i) a visual notification of a lane situation, (ii) an audio notification of said lane situation, or (iii) both said visual and said audio notification of said lane situation based on said likelihood values.

18. The method according to claim 16, wherein said first window and said third window represent a local context and contrast around said second window.

19. The method according to claim 16, wherein said calculation of said average values comprises:
 filtering each of a plurality of color-space components of pixels in said first window to generate said first set of three average values ($A_1$, $B_1$ and $C_1$);

filtering each of said color-space components of pixels in said second window to generate said second set of three of average values ($A_2$, $B_2$ and $C_2$); and filtering each of said color-space components of pixels in said third window to generate said third set of three average values ($A_3$, $B_3$ and $C_3$).

20. An apparatus comprising:

a memory configured to store an input image of road markings, said input image having a plurality of color channels; and a circuit configured to (i) calculate, for each pixel of said input image, a plurality of average values of each of said color channels for pixels in (a) a first window, (b) a second window containing a current pixel of interest and spatially separated from said first window by a number of pixel columns, and (c) a third window spatially separated from said second window by said number of pixel columns, wherein said plurality of average values comprise a first set of three average values ($A_1$, $B_1$, and $C_1$) corresponding to said first window, a second set of three average values ($A_2$, $B_2$, and $C_2$) corresponding to said second window, and a third set of three average values ($A_3$, $B_3$, and $C_3$) corresponding to said third window, (ii) calculate a feature descriptor comprising a plurality of feature values based on said average values of said first, said second, and said third windows for each pixel, wherein calculating said feature descriptor for each pixel comprises calculating one of said feature values as at least one of $(A_1+A_3)/2$, $(B_1+B_3)/2$, $(C_1+C_3)/2$, $((C_1/B_1)+(C_3/B_3))/2$, $(C_1-B_1+C_3-B_3)/2$, $(2 \times A_2)-A_1-A_3$, $(2 \times B_2)-B_1-B_3$, $(2 \times C_2)-C_1-C_3$, $(2 \times A_2)/(A_1+A_3)$, $(2 \times B_2)/(B_1+B_3)$, and $(2 \times C_2)/(C_1+C_3)$, and (iii) generate a plurality of likelihood values expressing a likelihood of a specific color road marking at each pixel location of said input image using said feature values of said feature descriptor of each pixel in a color classification process combining multiple weak depth-two decision trees in a cascade to form a strong classifier.

* * * * *